Dec. 6, 1960  O. W. SHIRLEY  2,962,901
GYROSCOPE
Filed Sept. 8, 1959  3 Sheets-Sheet 1
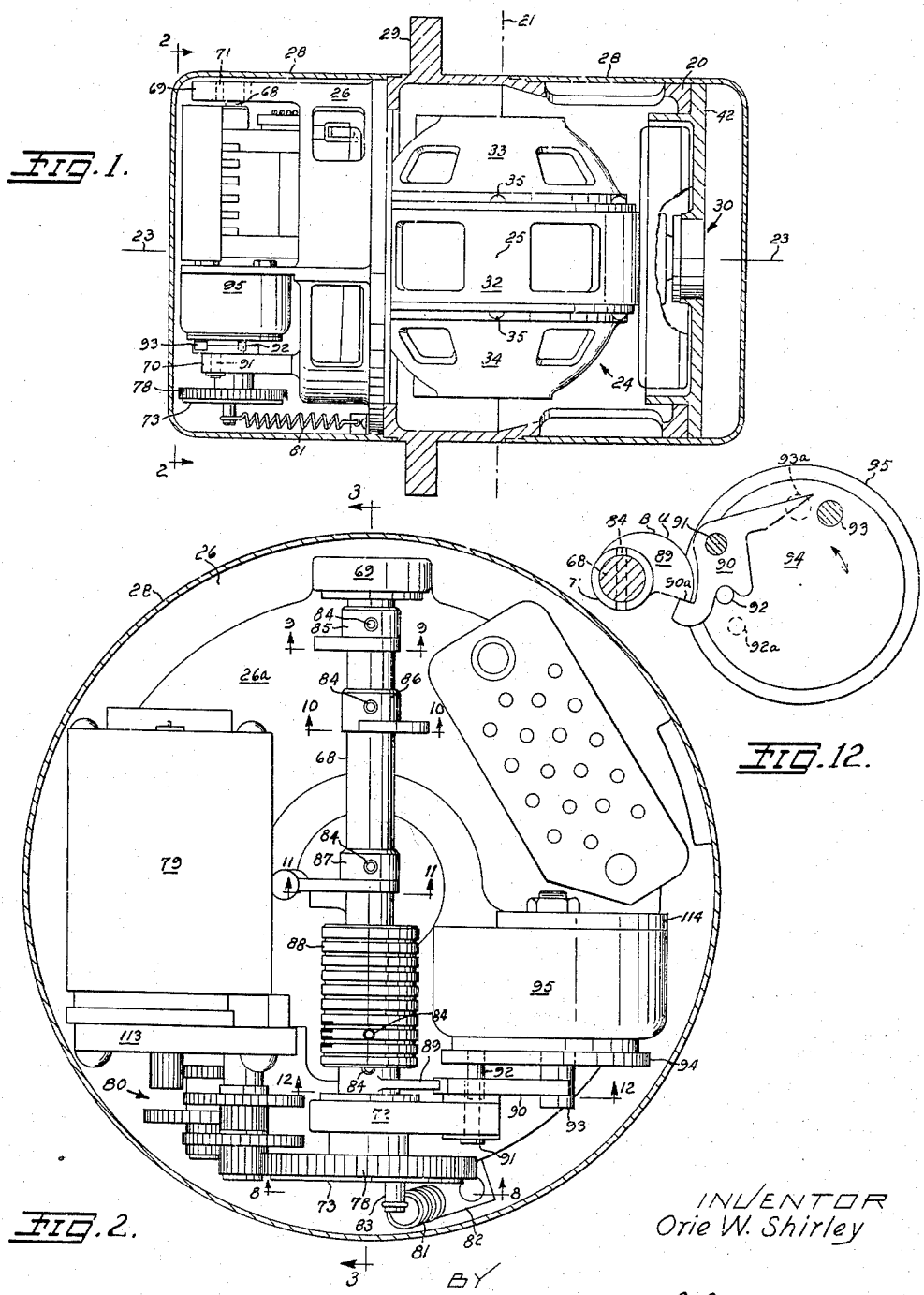
INVENTOR
Orie W. Shirley
BY
AGENT

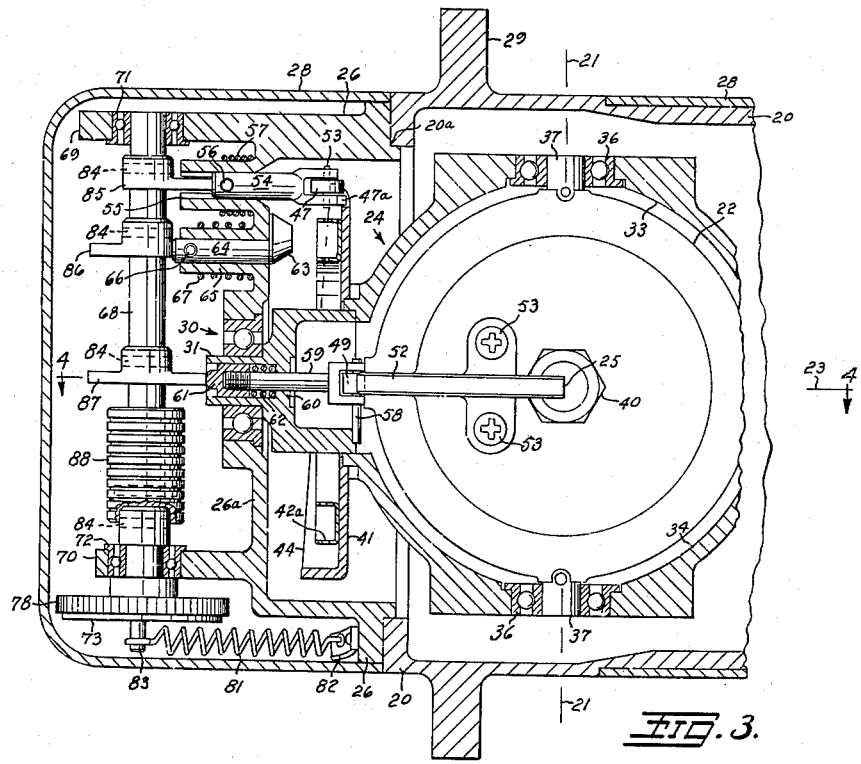

Dec. 6, 1960
O. W. SHIRLEY
2,962,901
GYROSCOPE
Filed Sept. 8, 1959
3 Sheets-Sheet 3
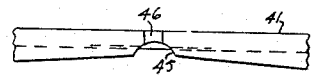
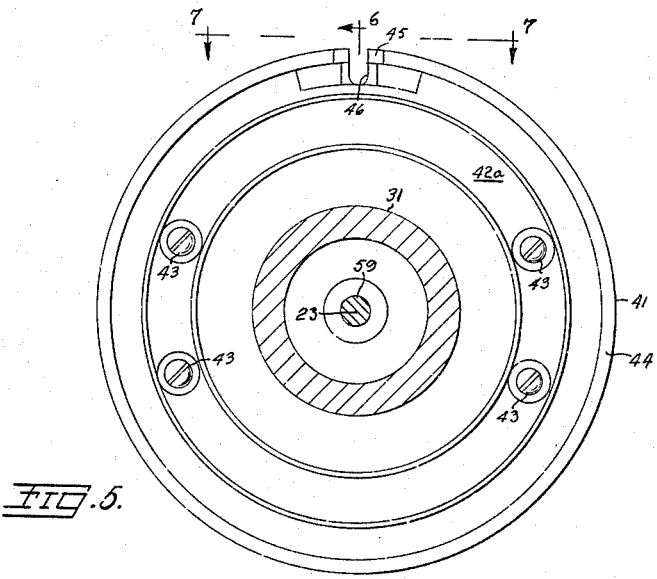
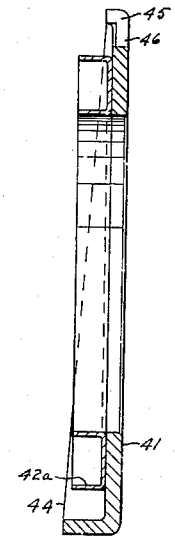
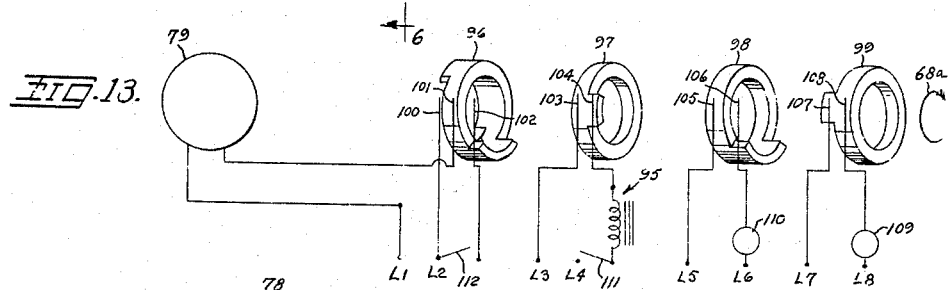
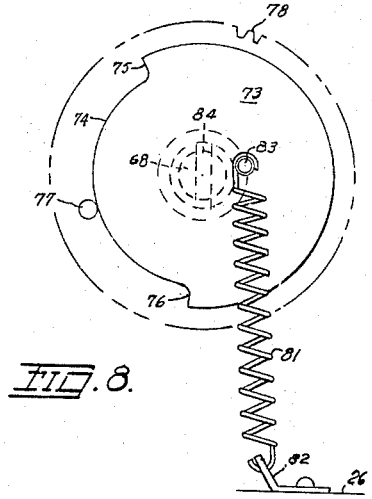
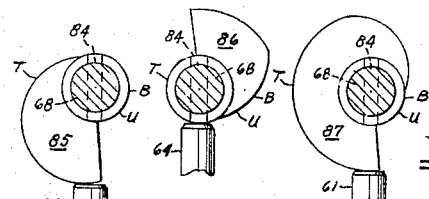
INVENTOR
Orie W. Shirley
BY
AGENT

United States Patent Office 2,962,901
Patented Dec. 6, 1960

1

2,962,901

GYROSCOPE

Orie W. Shirley, Portland, Oreg., assignor to Iron Fireman Manufacturing Company, a corporation of Oregon Filed Sept. 8, 1959, Ser. No. 838,589

8 Claims. (Cl. 74—5.1)

This invention relates generally to gyroscopes and more particularly to gyroscopes having means for the precise caging of both the inner and outer gimbal rings thereof to be followed when required by the instantaneous and precisely simultaneous uncaging or release of both the gimbal rings. Caging is understood to mean bringing the three major axes of the gyroscope into positions of mutual perpendicularity.

Like my older gyroscope disclosed in my U.S. Patent No. 2,874,577, issued February 24, 1959, this invention is a free gyroscope which has no means for continuous erection but which includes a novel and improved means for caging and uncaging the gyroscope as required.

Like that of the gyroscope of Patent No. 2,874,577 the present gyroscope includes within its case or inner gimbal ring, but not here shown, a 3 phase spin motor stator fixed to a stationary spin axis shaft secured transversely through the case. The relatively heavy spin wheel including the rotor iron and winding of the spin motor is mounted on the spin axis shaft for rotation thereabout within the case between the relatively stationary spin motor stator and the case.

The case or inner gimbal ring is freely rotatably carried within an outer gimbal ring on an inner ring axis perpendicular to the axis of the spin motor shaft.

The outer gimbal ring is rotatably carried within a frame for free rotation about an outer ring axis perpendicular to the inner ring axis.

The gyroscope is in normal, neutral or caged arrangement of parts when the inner gimbal ring is rotated on the inner ring axis to a position of perpendicularity of the spin and outer ring axes and when the outer gimbal ring is rotated on the outer ring axis to a preset position with respect to the frame.

The gyroscope is intended to be secured by its frame to any desired object, movable in space, in such a manner that in its caged condition the gyroscope will have its inner and outer perpendicular axes aligned respectively with reference axes about which the angular positions of the body may be indicated when the gyroscope wheel is freely spinning and the inner and outer rings are released from their caged restrictions. The means for indicating the angular positions of the inner and outer rings relative to their caged positions about their respective axes are well known in the art and no part of this invention so they are not here described.

It is the principal object of this invention to provide an improved gyroscope with means for quickly and precisely caging and uncaging the inner and outer rings thereof whereby, for a reasonable time after uncaging, the angular positions of the inner and outer gimbal rings about their respective axes relative to their caged positions about these axes will indicate the instantaneous positions of the frame about these axes.

It is another object to provide such a gyroscope with means for caging the gyroscope by first applying a holding brake to the outer gimbal ring for a definite time and within that time to cage and lock the inner gimbal ring, then to release the outer gimbal ring from the holding brake and to move the outer gimbal ring to its caged position and lock it there.

It is a third object to provide a gyroscope with such a caging mechanism that will operate automatically to cage the gyroscope in a minimum time after the caging cycle is initiated and then to signal that the gyroscope is caged and ready to be uncaged when desired.

It is a fourth object to provide a gyroscope with such a caging mechanism having means for holding both gimbal rings in their respective caged positions by latches so applied that they may be operated to unlatch both gimbal rings at precisely the same instant.

It is a fifth object to provide a gyroscope with uncaging means adapted simultaneously to free the inner and outer gimbal rings from their caged positions.

It is a sixth object to provide a gyroscope with novel and useful means for accomplishing the above objects within new standards of time limits and precision.

How these and other objects are attained is disclosed in the following specification referring to the attached drawing in which Fig. 1 is a fragmentary plan view in partial section of one form of the gyroscope of this invention as seen in the direction of the spin axis when the gyroscope parts are in caged relation.

Fig. 2 is an enlarged end elevation view in partial section as seen along the line 2—2 of Fig. 1.

Fig. 3 is a fragmental view in partial section along the line 3—3 of Fig. 2.

Fig. 4 is a fragmental view in partial section along the line 4—4 of Fig. 3.

Fig. 5 is a view in partial section along the line 5—5 of Fig. 4.

Fig. 6 is a longitudinal sectional view of the outer gimbal ring caging cam and annular brake channel of Fig. 5 as seen along the line 6—6.

Fig. 7 is a fragmental top view of the outer gimbal ring caging cam as seen along the line 7—7 of Fig. 5.

Fig. 8 is a fragmental view in partial section along the line 8—8 of Fig. 2.

Fig. 9 is a fragmental view in partial section along the line 9—9 of Fig. 2.

Fig. 10 is a fragmental view in partial section along the line 10—10 of Fig. 2.

Fig. 11 is a fragmental view in partial section along the line 11—11 of Fig. 2.

Fig. 12 is a fragmental view in partial section along the line 12—12 of Fig. 2.

Fig. 13 is a schematic diagram of the caging and locking motor, the unlocking solenoid, the drum type safety switches for operating and indicating the positions of the motor and the solenoid, together with the electric circuits associated therewith.

Like reference numerals refer to like parts in the several figures of the drawing.

Referring now to the drawing, Fig. 1 shows the present form of the gyroscope of this invention with the mounting ring 20 in section in the common plane of the axis 21 of the inner gimbal ring 22 and the axis 23 of the outer gimbal ring 24 when the gyroscope is in its caged position with its spin axis 25 perpendicular to the plane of the axes 21 and 23. Caging end base 26 completes the caging end of ring 20 and is secured thereto by screws, not shown. Synchro end plate 42 rabbeted to mounting ring 20 together with ring 20 and end base 26 completes the mounting ring assembly. End covers 28 protect and hermetically seal the active parts of the gyroscope but otherwise are not functional. Annular flange 29 of mounting ring 20 about its axis 23 is for the purpose of mounting the gyroscope where it is to be used, tested, adjusted or inspected.

End base 26 and end plate 42 of mounting ring 20 are seen in Fig. 4 to be formed along the axis 23 with bearing seats adapted to receive, as shown, the outer races of ball bearings 30, the inner races of which are adapted as shown to receive hubs 31 formed on the generally cylindrical band section 32 of outer gimbal ring 24. End bells 33, 34, see Fig. 1, secured to opposite faces of cylindrical section 32 by screws 35 are formed along axis 21 to receive the outer races of bearings 36 the inner races of which are adapted to receive, as shown in Fig. 3, hubs 37 of inner gimbal ring 22 supported therein for free rotation about axis 21.

As above noted, the inner gimbal ring with its spin wheel and motor as here used is clearly shown, described and claimed in my U.S. Pat. No. 2,874,577 above referred to. Suffice it to say here that the wheel and spin motor parts are assembled with the enclosing parts of case or inner gimbal 22 on spin axis 25 by nuts 40. See Fig. 4.

To describe the novel caging and uncaging structure of the present device attention is called to end base 26 of ring 20 which is seen in Fig. 3 to be annularly rabbeted thereto at 20a and held by screws, not shown. At about its axial mid-length end base 26 includes a transverse partition 26a which as previously noted is formed to receive axially therethrough one of the bearings 30 as required rotatably to support one of the hubs 31 of outer gimbal ring 24 cylindrical band section 32. See Fig. 3.

Within the interior space of end base 26, under partition 26a outer gimbal ring cam 41 is located (see Figs. 3 to 7) on outer gimbal ring 24 and together with annular caging brake channel 42a is secured to ring 24 by screws 43. Outer gimbal ring cam 41 is formed with an edge cam face 44 in a plane tipped slightly from the perpendicular to outer ring axis 23 in mirror symmetry about a plane 6—6 including the axis 23, see Figs. 5–7. Along plane 6—6 sunk into the low side of cam surface 44 is a fragmentally cylindrical rest 45 for a cam follower roller 47 intercepted by a caging slot 46 for a cam follower lock 47a, see Fig. 3.

Similar fragmentally cylindrical rest 48 for cam follower roller 49 intercepted by a caging slot 50 for cam follower lock 51, see Fig. 4, is sunk radially into inner gimbal ring cam 52 at its point of lowest radius. Cam 52 is secured to inner gimbal ring 22 by screws 53.

Outer gimbal ring cam follower roller 47 is rotatably supported on pin 53 in the bifurcated end of cam follower rod 54 longitudinally slidably supported in tubular bearing 55 outstanding as shown in Fig. 3 from transverse partition 26a of end base 26. The wall of bearing 55 from its free end is diametrically slotted to receive therethrough spring keeper pin 56 secured through rod 54 to rest on spring 57 to cause spring 57 to bias rod 54 and roller 47 away from outer gimbal ring caging cam face 44.

Inner gimbal ring cam follower roller 49 is rotatably supported on pin 58 in the bifurcated end of cam follower rod 59 longitudinally slidably supported in tubular bearing 60 formed on axis 23 through one of the hubs 31 of outer gimbal ring 24. Nut 61 threaded on the free end of rod 59 confines spring 62 between hub 31 and nut 61 to bias rod 59 and roller 49 away from inner gimbal ring cam 52.

Outer gimbal ring caging brake conical plug 63 for structural space reasons is seen to be eccentrically formed on brake rod 64 longitudinally slidably supported in tubular bearing 65 outstanding, as shown in Fig. 3, from transverse partition 26a of end base 26. The wall of bearing 65 from its free end is diametrically slotted to receive therethrough spring keeper pin 66 secured through rod 64 to rest on spring 67 to cause spring 67 to press rod 64 and brake plug 63 away from annular channel caging brake band 42a.

Caging cam shaft 68 is seen in Figs. 1–3 to be rotatably supported on bearing pedestals 69, 70 by bearings 71, 72.

Pedestals 69, 70 are formed outstanding on transverse partition 26a of caging end base 26. Welded to one end of cam shaft 68 is lost motion disk 73 formed to a reduced outer radius at 74 for 150 degrees between shoulders 75, 76. See Fig. 8.

Driving pin 77 subtending 10 degrees of arc about shaft 68 is positioned between shoulders 75, 76 of disk 73 and is fixed securely into low speed gear 78 journaled on shaft 68 to be driven freely clockwise thereabout by caging motor 79 through gear train 80, see Fig. 2, until pin 77 strikes shoulder 75 of disk 73 to advance disk 73 and shaft 68 clockwise as motor 79 runs and turns gear 78.

Overcenter caging, and uncaging spring 81 is strained between spring clip 82 secured to end base 26 and spring pin 83 secured to lost motion disk 73 at an angle of about 105 degrees clockwise from shoulder 75.

Secured to cam shaft 68 by individual pins 84 all in the same plane including the axis of shaft 68 are outer gimbal ring caging cam 85, outer gimbal ring braking cam 86, inner gimbal ring caging cam 87, electric switch barrel 88, and caging latch cam 89 shown separately in Figs. 9–13.

All of the figures of the drawing show the parts of the gyroscope in the caged position.

In Figs. 1, 2 and 12 caging latch 90 is shown pivotally secured by latch pin 91 and held in its caged position of engagement with latch cam 89 by caging pin 92 which like uncaging pin 93 is secured to armature plate 94 of rotary solenoid 95.

Electric switch barrel 88 includes ten individual rotary insulated conducting switching rings of which we are concerned with only four, of which the conducting rings 96, 97, 98 and 99 are shown schematically in Fig. 13 with their respective stationary contact brushes 100, 101, 102, 103, 104, 105, 106, 107, 108 and operating circuits.

Caging motor 79 is a single phase 26 volt 400 c.p.s. motor purchased as No. ACC–10–E–1 of the Clifton Precision Products Co., Inc., Clifton Heights, Pennsylvania, and, when energized, drives low speed gear 78 through gear set 80 at a rate of one revolution in ten seconds in the clockwise direction of shaft 68 as seen in Figs. 8 to 12 and the direction shown by the arrow 68a in Fig. 13. Motor 79 is secured to bracket 113 outstanding from transverse barrier 26a of end base 26.

Noting that the drawing shows the gyro and its parts in the caged position thereof and assuming in Fig. 13 that electric supply lines L1, L2 are connected to a source of 26 v. one phase 400 c.p.s. current, lines L3, L4 are connected to a source of 130 v. D.C. and that L5, L6 and L7, L8 are respectively connected to a source of signal current for energizing the caged indicator 109 and the uncaged indicator 110: it is seen that the energizing circuit of caged indicator 109 is closed between stationary contact brushes 107, 108 by movable contact ring 99; the energizing circuit of uncaged indicator 110 is held open between brushes 105, 106 by ring 98; ring 97 has closed the circuit between brushes 103, 104 so that uncaging solenoid 95 will be energized when uncaging switch 111 is closed; but that caging motor 79 cannot be energized because motor terminal brush 101 connected to ring 96 is not connected to line L2 through brush 100 and cannot be so connected through brush 102 by closing caking switch 112. Switches 111 and 112 are manually closed, spring return, momentary contact switches.

Noting Figs. 8 to 12 it is seen that when the gyro is caged spring 81 is strained between clip 82 and pin 83 to urge disk 73 with shaft 68 to rotate clockwise but caging latch 90 supported in position by caging pin 92 of armature plate 94 of rotary solenoid 95 restrains latch cam 89 and shaft 68 with disk 73 in the position shown in Fig. 8 with shoulder 75 of disk 73 advanced about 70 degrees ahead of pin 77 of gear 78.

Solenoid 95 is specified as Ledex Rotary Stroke Solenoid No. H–1146–033–X6–X9 28 v. D.C. 25 degree Left-Hand Stroke and is purchased from J. H. Leland, Inc., 123 Webster St., Dayton 2, Ohio. Solenoid 95 is supported on bracket 114 outstanding from transverse partition 26a of end base 26.

On momentary closure of uncaging switch 111 rotary armature plate 94 with its pins 92 and 93 rotate CCW 25 degrees to give pins 92 and 93 the unlatching positions 92a and 93a and then is returned by internal spring means to the position shown in Fig. 12.

When the gyro is caged, as seen in Figs. 3 and 5–9, outer gimbal ring caging cam 85 holds bar 54 with cam follower 47 and latch 47a engaged in caged position with outer gimbal ring cam 41. As seen in Figs. 3 to 8 and 10 outer gimbal stop cam will have released brake bar 64 with conical shoe 63 from annular brake channel 42a. And, as seen in Figs. 3, 4 and 11, inner ring caging cam 87 holds bar 59 with cam follower roller 49 and latch 51 engaged with inner gimbal ring cam 52 in the caged position of inner gimbal ring 22.

When it is desired to uncage the gyro all that is necessary is to momentarily close uncage switch 111, Fig. 13, to energize solenoid 95, Figs. 12 and 13, to rotate armature plate 94 CCW to cause pins 92, 93 to unlatch cam 89 and allow spring 81, Figs. 1–4 and 8 to rotate disk 73 and shaft 68 clockwise about 63 degrees until stopped by shoulder 76 of disk 73 as it strikes pin 77 of low speed gear 78.

The uncaging operation very rapidly accomplished under the unlatching power of solenoid 95 and the rotation of disk 73 by spring 81 has caused cams 85—89 and switch rings 96—99 simultaneously to advance about 63 degrees with disk 73, thus simultaneously releasing bars 54, 59 to release latches 47a, 51 from gimbal ring cams 41, 52. Stop cam 86 will have started to depress brake bar 64 and latch cam 89 will have advanced to be free of latch 90. Cage indicator 109 will be deenergized by the dropping of brush 107 from switch ring 99, Fig. 13. Uncage indicator will be energized by ring 98 moving into contact with brush 106; switch 111 will become inoperative to energize solenoid 95 by ring 97 moving out from under brush 104; and caging switch 112 will become operative to energize motor 79 by switch ring 96 moving up into contact with brush 102.

To again cage the gyro, switch 112 is closed to energize motor 79 through L2, 112, 102, 96 and 101 and almost immediately a holding circuit through L2, 100, 96 and 101 is established so switch 112 can be released. Motor 79 continues to turn low gear 78 with pin 77 clockwise with shoulder 76 of disk 73 following pin 77 for about 25 degrees or until spring 81 is at its minimum length, after which pin 77 continues while disk 73 is stopped until pin 77 is advanced another 140 degrees to strike shoulder 75 of disk 73. Then gear pin 77 must travel 180 degrees to move disk 73 with pin 83 to the longest position of spring 81 and somewhat farther to an overcenter position of spring 81 where spring 81 takes over and moves shoulder 75 of disk 73 rapidly ahead of pin 77 until all of the parts are again in the caged position shown in the drawings.

An examination of Figs. 8 to 13 together with the above explanation is sufficient to show that after the 63 degrees uncaging movement of shaft 68, cams 85, 86, 87 will be in contact with cam follower rods 54, 64, 61 at the positions U of the respective cams. Latch cam 89 will have advanced until its position U is riding against the outer end of latch face 90a of latch 90. Then when closing caging switch 112 starts caging motor 79 advancing pin 77 of low speed gear 78, spring 81 is allowed to advance disk 73 with shaft 68 until spring 81 is at the bottom of its stroke and positions B shown on cams 85, 86, 87 are in contact with their respective rods 54, 64, 61 and disk 73 with cams 85, 86, 87 remains in that position for 140 degrees of advance of pin 77 at which time pin 77 strikes shoulder 75 of disk 73. Then as pin 77 continues to advance it again starts to advance disk 73 and advances disk 73 about 180 degrees or until pin 83 of disk 73 carries spring 81 over top center at which time spring 81 takes over and rapidly advances disk 73, shaft 68, cams 85, 86, 87 and switch rings 96, 97, 98 and 99 to their caged positions as shown in the drawings.

It is seen that low speed gear 78 with pin 77 for each caging and uncaging cycle makes only one complete revolution starting and ending with pin 77 in the position shown in Fig. 8, travelling at a continuous speed of 1 revolution in 10 seconds or 36 degrees in 1 second. But it should be noticed that, practically speaking, motor 79 with low speed gear 78 and pin 77 is only used for cocking spring 81 which in turn cages and uncages the gyro. Thus when uncaging switch 111 is closed solenoid 95 unlatches latch cam 89 and spring 81 advances disk 73 and shaft 68 about 60 degrees with cams 85, 86, 87 and switch rings 96 to 99. In their uncaged positions, cam rods 54, 64 and 61 contact cams 85, 86, 87 respectively at their U positions while switch ring 99 has moved out of contact with brush 107, switch ring 98 has contacted brush 106, switch ring 97 has moved out of contact with brush 104 and switch ring 96 has contacted brush 102 and the movement of shaft 68 has been stopped by shoulder 76 of disk 73 striking pin 77 of gear 78 which is stationary. This uncaging operation powered by spring 81 is practically instantaneous.

In the caging part of the cycle, as above noted, when switch 112 is closed to start motor 79, gear 78 begins its one complete and continuous revolution of pin 77. During the first 26° of advance of pin 77, disk 73 is advanced by spring 81 until spring 81 is at the bottom of its stroke where it remains holding disk 73 stationary until pin 77 with gear 78 advances 140 degrees to strike shoulder 75 of disk 73. At this time spring 81 is still in its under center position with the B positions of cams 85, 86, 87 in contact with their respective rods 54, 64, 61. But gear 78 with pin 77 must now advance disk 73 to take upper spring pin 83 at least 180 degrees to the top center position of spring 81. At this time pin 77 will have advanced a total of about 346 degrees while disk 73 with shaft 68 will have advanced a total of only about 206 degrees. As spring pin 83 passes beyond top center spring 81 very rapidly pulls shoulder 75 of disk 73 free of gear pin 77 and almost instantaneously advances pin 83 about 92 degrees where shaft 68 and all of the parts riding with it will be stopped in their caged positions by the latching of latch cam 89 on latch 90.

To aid in understanding the operation of the above disclosed gyro structure and the elegance of its conception it is again pointed out that the drawing figures show the parts of the gyro in the caged positions thereof.

To uncage the gyro, uncaging switch 111 is closed for an instant and solenoid 95 is energized to rotate its armature plate 94 CCW whereby its armature plate pin 92 releases latch 90 and armature plate pin 93 rotates latch 90 to release latch cam 89 and spring 81 rotates its pin 83 with disk 73 and shaft 68 CW until shoulder 76 of disk 73 strikes pin 77 of low speed gear 78. At this time cams 85, 86, 87 and 89 will contact their cooperating parts 54, 64, 61 and 90 respectively at the cam face positions marked "U." The uncaged positions of switch rings 96 to 99 of barrel switch 88 is explained above.

Note that when uncaged cams 85 and 87 have completely released cam follower rods 54 and 61 and their respective rollers 47, 49 and latches 47a, 51 from outer gimbal ring cam 41 and inner gimbal ring cam 52. However from Fig. 10 it is seen that as outer gimbal ring brake cam 86 has rotated its contact with brake rod 64 to its U position, the brake rod 64 with its brake head cone 63, Fig. 3 has moved towards annular channel outer gimbal brake band 42a.

With the gyro uncaged, to cage it, caging switch 112 is closed for a moment until a motor holding circuit is established by contact of switch ring 96 with contact 100 and the motor will run for a complete revolution of low speed gear 78 or until pin 77 of gear 78 again takes the position shown in Fig. 8 which is the position pin 77 has at both ends of the caging time period and throughout the complete uncaging time period when the motor is not running.

At the start of the caging period it is understood that shoulder 76 of disk 73 is held against pin 77 and as pin 77 moves with gear 78 spring 81 causes disk 73 to follow pin 77 until spring pin 83 is at its bottom position. At this time the several cams 85, 86, 87, 89, will have their face positions marked B in contact with their respective cooperating rods and latch. Cam 86 will have depressed brake rod 64 until its cone head 63 is almost in contact with brake band 42a.

Now low speed gear 78 and its pin 77 continue to move for an additional 140° without moving disk 73 and cam shaft 68 until pin 77 strikes shoulder 75 of disk 73 and again takes disk 73 and shaft 68 along with it for something over 180 degrees since spring pin 83 must carry spring 81 over its top center position where spring 81 can again drive disk 73 independently ahead of pin 77 of gear 78. The spring 81 is at its top center position and shaft 68 has moved cams 85, 86, 87, 89 to positions of contact T with respect to their cooperating parts 54, 64, 61 and 90a. From Figs. 9, 10, 11, it is seen that by the time spring pin 83 has reached its top center position brake cam 86 has first set brake head 63, Fig. 3, on brake band 42a and has held outer gimbal ring stationary while cam 87 has set inner gimbal ring cam follower roller 49 and latch 51, Figs. 3 and 4, into inner gimbal ring cam 52 at its caged position. Also brake head 63 has been released from brake band 42a to free outer gimbal ring 24 and its caging cam 41 but cam 85 at its surface position T has contacted outer gimbal ring caging cam 41 with roller 47 of follower rod 54. Then as spring 81 goes over its top center position it advances disk 73 and shaft 68 to the final caged position shown in the drawing and in so doing completes the caging of outer gimbal ring 24 by cam 85.

It is of interest to note that channel shaped brake band 42a and conical shaped brake shoe or head 63 are particularly discovered to possess excellent properties of form and material essential to their duties of operating in relatively high ambient temperature over relatively long periods of time without deteriorating or changing their conditions of surface or shape or physical properties. For these reasons and channel 42a is made of resilient hard beryllium copper and the head 63 is made of hard stainless steel. The brake is applied substantially instantaneously as applied but without shock as soon as the head enters and touches the sides of channel 42a, but there is no destructive shock of head 63 striking brake band 42a since the resilience of the sides of channel 42a allows the channel to receive an overtravel therein of the cone without damage to the parts.

Having recited some of the objects of my invention, illustrated and described a preferred form in which my invention may be practiced and described its operation, I claim:

1. A gyroscope including a frame, an outer gimbal ring supported in said frame on an outer ring axis, an inner gimbal ring supported in said outer ring on an inner ring axis perpendicular to said outer ring axis, a rotor supported in said inner ring on a spin axis perpendicular to said inner ring axis, each of said axes intersecting each other of said axes at a point, and caging means for caging said gyroscope, said gyroscope being caged when said spin axis is perpendicular to said outer ring axis and said inner ring axis is at a preset position of rotation about said outer ring axis, said caging means including a cam shaft rotatably carried on said frame on a cam shaft axis intersecting and perpendicular to said outer ring axis, said inner gimbal ring including an edge cam facing said cam shaft in a plane perpendicular to said cam shaft including said spin axis, said outer gimbal ring including a cylindrical edge cam facing said cam shaft concentric with said outer ring axis, said outer gimbal ring including an annular brake band concentric with said outer ring axis facing said cam shaft, said frame including an outer ring cam follower rod, an outer ring brake follower rod and an inner ring cam follower rod each supported by said frame for laterally spaced parallel motion in a plane including the axes of said cam shaft and said outer gimbal ring, each of said cam follower rods including a roller for riding its respective gimbal ring cam and a latch for latching its respective ring cam when its respective ring is in its caged position, said outer ring brake follower rod including a brake shoe for engaging said outer ring brake band, each of said rods including means for biasing said rods towards said cam shaft, and said cam shaft including spaced therealong to rotate therewith in parallel planes normal to said shaft an inner ring caging cam for longitudinally positioning said inner ring cam follower rod, an outer ring caging cam for longitudinally positioning said outer ring cam follower rod and an outer ring brake rod cam for longitudinally positioning said outer ring brake rod whereby when said gyroscope is free and uncaged and said cam shaft is rotated in one direction said brake shoe will first engage said brake band to hold said outer gimbal ring, said inner gimbal ring will next be engaged by its said roller and latch to latch said inner ring in its caged position, said brake band will then be released by said brake shoe and finally said outer gimbal ring will be caged by its said roller and latch to latch said outer gimbal ring in its caged position.

2. The gyroscope of claim 1 in which said brake band is annular and is channel shaped in section, the open face of said channel facing said cam shaft and said brake shoe is formed as a truncated cone with the small end thereof towards said channel, the material of said annular brake band and said shoe being a temperature resistant metal and said channel sides being adapted to receive said shoe resiliently therebetween.

3. The gyroscope of claim 1 including driving means for rotating said cam shaft in said one direction, said driving means including a spring pin secured to said cam shaft at a substantial radial distance from the axis thereof, a spring clip secured to said frame, a tension spring strained between said spring clip and said spring pin and means other than said spring for rotating said cam shaft in said one direction to move said spring pin from its under center position to its over center position and said spring being capable of moving said spring pin with said shaft from the over center position of said spring to its said under center position.

4. The gyroscope of claim 3 including a caging latch cam secured to said cam shaft to rotate therewith, a caging latch rotatably secured on said frame in the plane of said latch cam, caging latch biasing means biasing said caging latch rotatably into the path of said latch cam to stop the rotation of said cam shaft when said gyroscope is caged and means for overcoming instantaneously said caging latch biasing means to release said latch cam and said shaft to said spring to uncage said gyroscope.

5. The gyroscope of claim 4 in which said means for biasing said caging latch and overcoming said biasing caging latch biasing means includes an electric means operable in one direction when energized and biased to return in the other direction when de-energized.

6. The gyroscope of claim 3 in which said means other than said spring for rotating said cam shaft includes a pair of angularly spaced radial abutments secured on said shaft, a motor driven low speed gear loosely supported on said cam shaft for free rotation of said cam shaft therein and a drive pin secured to said gear to extend therefrom between said abutments, said motor including control means operable when said gyroscope is uncaged to energize said motor to drive said gear only for one constant speed revolution during the operating time of which the lost motion between said drive pin and said abutments will cause said motor to drive said shaft to apply said brake to said outer gimbal ring until said inner gimbal ring is caged and thereafter to release said brake and move said spring pin to its overcenter position and thereafter to cause said spring to drive said shaft to cage said outer gimbal ring and said caging latch cam strikes said caging latch when said cam shaft is at its caged position of said gyroscope.

7. In a three axes free gyroscope including means for caging said free gyroscope about two axes to bring said three axes into mutual perpendicularity at a point and for uncaging said gyroscope to its free condition, a cam shaft for moving the elements of said means in a desired sequence and means for driving said shaft intermittently during a complete caging uncaging cycle of one revolution of said shaft, said means for driving said shaft including a resilient member strained during a first part of said revolution of said shaft to store potential energy in said member and then released first to finish caging said gyroscope during a second part of said revolution and again released for uncaging said gyroscope as desired during the remainder of said revolution of said shaft.

8. In a compact free gyroscope included in a small hermetically sealed space, a power driven means within said space for caging and uncaging said gyroscope as required, said means including a continuous annular high temperature resistant brake band secured axially concentrically to the outer gimbal ring of said gyroscope and a high temperature resistant brake shoe supported movably on an axis parallel with the axis of said ring for frictional contact with said brake band, said band being formed of a continuous ring of resilient metal channel shaped in section with the open side of said channel facing axially away from said outer gimbal ring and said shoe being formed as a truncated cone on an axis parallel to the axis of said ring at the mid radii of the two side rings of said channel said small end of said cone being pointed into said channel and said small end of said cone being slightly smaller in diameter than the width of said channel section, whereby said brake will include no organic heat destructive frictional or resilient materials.

References Cited in the file of this patent
UNITED STATES PATENTS

| | | |
|---|---|---|
| 2,645,129 | Brown | July 14, 1953 |
| 2,807,169 | Fischer | Sept. 24, 1957 |
| 2,874,577 | Shirley | Feb. 24, 1959 |